April 8, 1969 M. H. LINDSEY 3,437,211
VACUUM FILTRATION DEVICE
Filed June 6, 1967
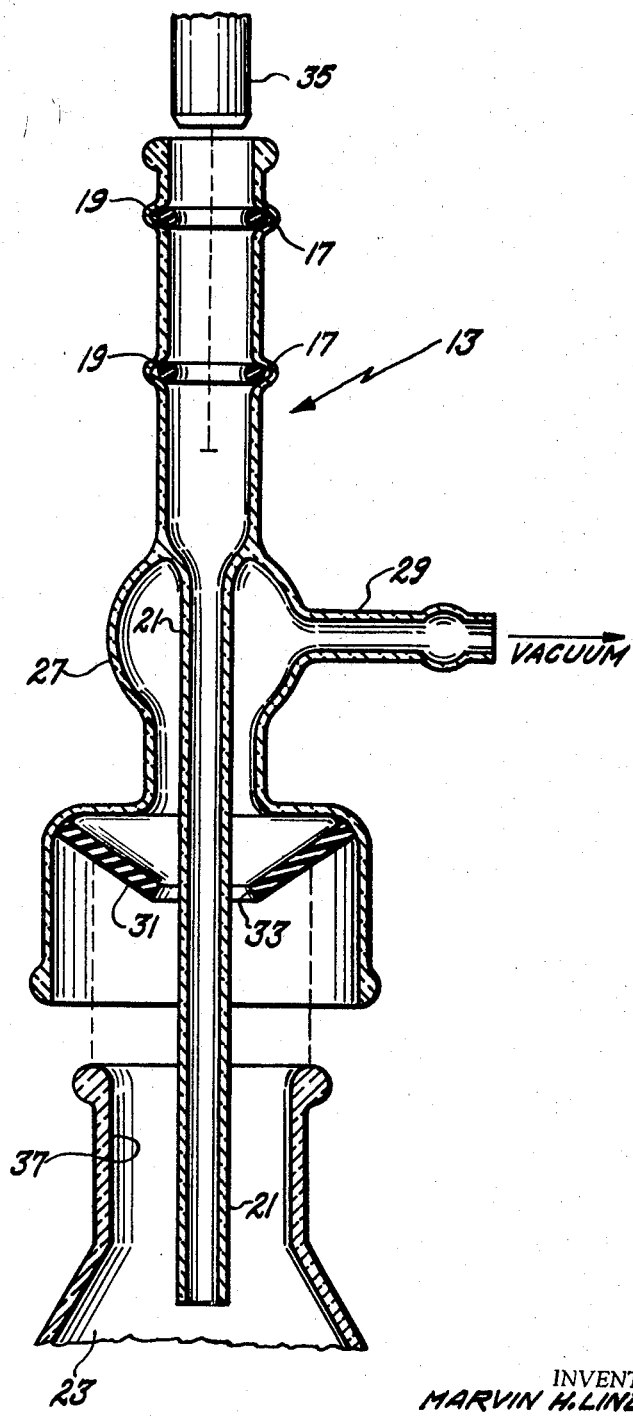
INVENTOR.
MARVIN H. LINDSEY
BY Harry A. Herbert Jr
Arsen Tashjian
ATTORNEYS United States Patent Office 3,437,211
Patented Apr. 8, 1969

3,437,211
VACUUM FILTRATION DEVICE
Marvin H. Lindsey, 3911 E. Palfrey,
San Antonio, Tex. 78223
Filed June 6, 1967, Ser. No. 644,469
Int. Cl. B01d 29/42, 35/14
U.S. Cl. 210—406    4 Claims

ABSTRACT OF THE DISCLOSURE

A filtration device for collecting a filtrate under vacuum conditions wherein the material to be filtered is disposed in a filter funnel which is sealed to the neck portion of the device. A resilient gasket of frusto-conical configuration is positioned in the lower section of the device for engagement with the mouth of a filtrate collection receptacle and a vacuum line is attached to the tubulation section for evacuating the collection receptacle to accelerate the passage of the filtrate through the filter funnel.

The invention relates to a vacuum filtration device and, more particularly, the invention is concerned with providing a filtration device for bacteriological and ultrafiltration processes which are carried out under vacuum conditions using a wide variety of collection receptacles and commercially available micro filters.

In the separation of matter in suspension in a liquid, it is common practice to pass the liquid portion through a porous article or mass. During the preparation of bacteria-free liquids, relatively large volumes of liquid must be forced through filter media of very small pore size under sterile conditions. This procedure presents many problems particularly with regard to the sterilization of the apparatus and the necessity of special equipment for collecting the filtrate. Also, it is most desirable to reduce the filtration time both from an efficiency standpoint and to reduce the chance of loss or damage to solutions that are affected by light or air as well as those requiring close temperature control. Vacuum filtration does hasten the passage of filtrate through the filtering medium.

Heretofore, filtration devices of the type which would accomplish the necessary functions were bulky and difficult to sterilize as a unit in the autoclave. Many ultra-filtration devices now available are constructed of metal and do not permit the observation of passage of filtrate during the filtration operation. Other devices are too slow to be practical where large amounts of filtrate are to be collected and, when used with a vacuum filtration system, it becomes necessary to use specially made filter elements along with collector flasks which are useful only with one particular vacuum system.

The invention hereinafter described includes a vacuum filtration device which can be used with presently available filter elements and with ordinary flasks found in any chemical laboratory or hospital. The device is easily sterilized as a unit in the autoclave and may be used with ordinary readily available laboratory glassware for collecting the filtrate. A plurality of the devices can be ganged to accommodate large quantities of liquid at one time and, being made of glass, permit the visual observation of the flow of filtrate during the filtration operation.

Accordingly, it is an object of the present invention to provide a vacuum filtration device for collecting a filtrate directly into a wide variety of containers at a high filtration rate.

Another object of the invention is to provide a filtration device having an upwardly extending neck portion with a sealing means disposed therein to form an airtight seal around the stem of a filter funnel, which contains the material to be filtered and is inserted in the neck of the device.

Still another object of the invention is to provide a filtration device having a bell shaped outlet portion wherein there is positioned a gasket seal which engages the mouth of a filtrate collecting container to produce an airtight seal. The bell portion may be any convenient size to accommodate various collector flasks which can be quickly and easily interchanged.

A further object of the invention is to provide a filtration device which is simply and easily cleaned and sterilized and requires little or no maintenance during the filtration process.

A still further object of the invention is to provide a filtration device which does not require the use of rubber stoppers or other auxiliary equipment thereby minimizing contamination by foreign matter which is a problem in conventional bacteriological filtration apparatus.

Another still further object of the invention is to provide a vacuum filtration device which can be used with a wide variety of collection vessels, thus obviating the need for large, cumbersome and expensive vacuum flasks.

These and other objects, features and advantages will become more apparent after considering the following detailed description taken in conjunction with the annexed drawing and appended claims.

In the accompanying drawing there is shown an elevation view in cross section of a vacuum filtration device according to the invention.

Referring now to the drawing, the novel filtration device is designated generally by the reference numeral 13. The uppermost or neck portion 15 of the device 13 is tubular in cross section and includes a plurality of circular grooves 17 on the inside wall thereof. A corresponding number of O rings 19 are positioned so that their outside surface seats in the grooves 17. A delivery tube 21 is attached at the lower end of the neck portion 15 and forms a downward extension thereof through which the filtrate passes into a collecting container 23.

The lower portion of the device includes a bell 25 which is an enlarged section and serves as a guide to position the device on the collecting container 23. The bell 25 may be constructed in any convenient size necessary to accommodate various filtrate collecting containers. In an alternative embodiment of the invention, the inner wall of the bell 25 may be ground to mate with a corresponding ground outer wall on a collecting container to form an interjoint which would be substantially airtight. This latter embodiment is particularly useful when it is desired to operate several of the filtration devices simultaneously in order to accommodate large quantities of filtrate at one time. The collecting means would include a common passage having a series of ground surfaces extending therefrom which would each be dimensioned to engage one of the filtration devices and carry the filtrate to a common tube and into a collecting container.

In the central portion of the device 13, there is an enlarged tubulation section 27 which is in communication with the bell 25 and the interior of collector 23. An outwardly extending connection 29 is provided to which an evacuation tube may be attached when the filtration is to be carried out under vacuum conditions. A gasket seal 31 of resilient material, preferably neoprene, is positioned in the upper part of the bell 25 and is sealed thereto at the wall junction area. The gasket seal 31 is frusto-conical in configuration downwardly disposed so as to engage the upper lip of the collector 23 along the sloping conical section thereby producing an airtight seal therebetween. Thus, when the vacuum is applied at the connection 29 the air in the collector flask 23 is drawn upward through the opening 33 in the gasket seal 31 effectively evacuating the collector 23 and hastening the filtration process by causing the filtrate to be drawn down through the delivery tube 21.

In operation, a vacuum line is attached to the tubulation section 27 at the connection 29. The stem 35 of a filter funnel (not shown) is inserted in the neck portion 15 of the device 13 and the O rings 19 provide a seal between the neck 15 and the stem 35. The collector flask 23 in which the filtrate is to be collected is then placed so that the delivery tube 21 enters thereinto and the mouth portion 37 contacts the gasket 31 to form an airight seal. The solution in the funnel will be drawn through the filter and into the collector 23 by the vacuum conditions in the lower section of the device 13.

It should be noted that the device hereinbefore disclosed represents a substantial technological improvement over currently available vacuum filters. The device, when ganged, can accommodate large quantities of filtrate at one time or quite modest volumes when used in the individual mode. Rapid and reliable interchange of collection vessels and filters is permitted and the device is simple to clean and maintain. The need for large, cumbersome and expensive vacuum flasks is obviated by the fact that the device can be used with a wide variety of ordinary beakers or flasks as receptacles in which to collect the filtrate. Contamination from rubber stoppers and other auxiliary equipment is minimized because of the unitized construction of the device which also allows convenient sterilization in the autoclave.

Although the invention has been illustrated in the accompanying drawing and described in the foregoing specification in turms of preferred embodiments thereof, it should be understood that the invention is not limited to these embodiments or to the particular uses mentioned. It will be apparent to those skilled in the art that various changes, alterations, modifications, and substitutions, particularly with respect to the construction details can be made in the arrangement of the several sections without departing from the spirit and scope of the appended claims.

Having thus set forth and disclosed the nature of my invention, what I claim and desire to secure by Letters Patent of the United States is:

1. A filtration device for collecting a filtrate under vacuum conditions, said device comprising an elongated neck portion in the upper section, sealing means disposed in the wall of said neck portion, said sealing means engaging the outer surface of the stem of a filter funnel inserted in said neck portion, an elongated delivery tube attached at the lower end of said neck portion and extending downwardly therefrom, a bell portion forming the lowermost section of said device, a gasket seal having a central opening fixedly attached to the upper inner wall of said bell portion, said delivery tube passing through the central opening in said gasket seal and into a collecting receptacle disposed thereunder, the mouth of the collecting receptacle being in contact with the surface of said gasket to form an airtight seal therebetween, and means for evacuating the interior of the collecting receptacle, the filtrate from the filter funnel being drawn through said delivery tube into the collecting receptacle during the vacuum filtration process.

2. The filtration device defined in claim 1 wherein the means for evacuating the interior of the collecting receptacle includes a tubulation section disposed between said neck portion and said bell portion, said tubulation section being operatively connected to said bell and the interior of the collecting receptacle, and an outwardly extending connection for attaching a vacuum line thereto for evacuating the collecting receptacle during the filtration process.

3. The filtration device defined in claim 1 wherein said gasket seal includes a hollow resilient member of frusto-conical configuration, the large diameter being upwardly disposed and fixedly attached to the uppermost portion of the inner wall of said bell section, and the smaller diameter being downwardly oriented and having a central opening through which said elongated delivery tube passes.

4. The filtration device defined in claim 1 wherein said sealing means in said neck portion includes a plurality of O rings disposed in a corresponding plurality of circular outwardly extending grooves in the inside wall of said neck portion, said O rings and grooves being in spaced relationship to each other along the length of said neck portion for engaging the smooth outer surface of the stem of a filter funnel inserted thereinto to form an airtight seal therebetween.

References Cited
UNITED STATES PATENTS

| | | | |
|---|---|---|---|
| 1,052,391 | 2/1913 | Valerius et al. | 210—416 |
| 2,006,513 | 7/1935 | Rasched et al. | 23—259 |
| 2,379,101 | 6/1945 | Post | 210—455 |
| 2,835,191 | 5/1958 | Clurman | 210—474 X |

REUBEN FRIEDMAN, *Primary Examiner.*

J. ADEE, *Assistant Examiner.*

U.S. Cl. X.R.

23—292; 210—455, 474